US007936333B2

(12) United States Patent
Ku et al.

(10) Patent No.: US 7,936,333 B2

(45) Date of Patent: May 3, 2011

(54) SYSTEM FOR DISPLAYING IMAGE AND DRIVING METHOD FOR LIQUID CRYSTAL DISPLAYING DEVICE

(75) Inventors: Ksuan-Chun Ku, Changhua (TW); Wei-Cheng Chen, Sinying (TW)

(73) Assignee: Chimei Innolux Corporation, Chu-Nan, Miao-Li County (TW)

( * ) Notice: Subject to any disclaimer, the term of this patent is extended or adjusted under 35 U.S.C. 154(b) by 860 days.

(21) Appl. No.: 11/798,876

(22) Filed: May 17, 2007

(65) Prior Publication Data

US 2007/0268232 A1 Nov. 22, 2007

(30) Foreign Application Priority Data

May 19, 2006 (TW) ................................ 95117931 A

(51) Int. Cl.
*G09G 3/36* (2006.01)
*G06F 3/038* (2006.01)

(52) U.S. Cl. .......... 345/100; 345/87; 345/211; 345/212; 345/204

(58) Field of Classification Search ............ 345/87–100, 345/204–214, 690–697
See application file for complete search history.

(56) References Cited

U.S. PATENT DOCUMENTS

| | | | | |
|---|---|---|---|---|
| 5,453,757 | A * | 9/1995 | Date et al. | 345/89 |
| 5,578,957 | A * | 11/1996 | Erhart et al. | 327/333 |
| 6,181,313 | B1 * | 1/2001 | Yokota et al. | 345/100 |
| 6,392,628 | B1 * | 5/2002 | Yamazaki et al. | 345/98 |
| 6,836,269 | B2 * | 12/2004 | Maeda et al. | 345/212 |
| 7,167,154 | B2 * | 1/2007 | Sato et al. | 345/100 |
| 7,224,336 | B2 * | 5/2007 | Katsutani | 345/87 |
| 2003/0234761 | A1 * | 12/2003 | Washio et al. | 345/100 |
| 2005/0007324 | A1 * | 1/2005 | Inada | 345/87 |
| 2005/0030276 | A1 * | 2/2005 | Murakami et al. | 345/102 |
| 2005/0093851 | A1 * | 5/2005 | Nakamura et al. | 345/204 |

* cited by examiner

*Primary Examiner* — Bipin Shalwala
*Assistant Examiner* — Sosina Abebe
(74) *Attorney, Agent, or Firm* — Birch, Stewart, Kolasch & Birch, LLP

(57) ABSTRACT

A system for displaying image includes a driving circuit of a liquid crystal displaying device. The driving circuit of the liquid crystal displaying device includes a shift register, a voltage booster and a sample switch. The shift register receives an input pulse signal and shifts the input pulse signal to output an output pulse signal. The voltage booster is electrically connected with the shift register to receive the output pulse signal, and generates a boost voltage to output a boost signal within the enable time of the output pulse signal. The sample switch is electrically connected with the voltage booster to receive the boost signal. The boost signal controls the sample switch to sample a data signal.

11 Claims, 12 Drawing Sheets

SYSTEM FOR DISPLAYING IMAGE AND DRIVING METHOD FOR LIQUID CRYSTAL DISPLAYING DEVICE

BACKGROUND OF THE INVENTION

1. Field of Invention

The invention relates to a system for displaying image and a driving method for a liquid crystal displaying device, and, in particular, to a system for displaying image and a driving method for a liquid crystal displaying device that operates in a low voltage.

2. Related Art

In the TFT LCD device (thin-film-transistor liquid-crystal-displaying device), the transistor of the LCD panel includes, according to its structure and manufacturing process, the α-Si TFT (amorphous Si) and Poly-Si TFT (polysilicon). In comparison with the α-Si TFT, the Poly-Si TFT has a lower threshold voltage and a higher electron mobility rate. Therefore, the Poly-Si LCD panel has lower power consumption and is able to integrate with a driving circuit.

Referring to FIG. 1, an LCD device 1 includes a Poly-Si LCD panel 10 and a timing controller 11. A level shifter 12, a scan-line driving circuit 13, a plurality of scan lines $\mathbf{14}_1$-$\mathbf{14}_m$, a data-line driving circuit 15, a plurality of data lines $\mathbf{16}_1$-$\mathbf{16}_n$, and a pixel array 17 are formed on the Poly-Si TFT LCD panel 10. The scan-line driving circuit 13 includes a plurality of shift registers 131. The data-line driving circuit 15 includes a plurality of shift registers 151 and a plurality of samplers/holders 152.

The timing controller 11 is manufactured by VLSI processes. It operates at 3V and generates a gate start pulse signal $SP_G$, a gate clock $CLK_G$, a source start pulse signal $SP_S$, a source clock $CLK_S$, and a plurality of data signals DATA. The voltages of these signals are between 0V-3V. Besides, the level shifters 12 operate at 9V. They convert the voltages of these signals from 3V into 9V by using the transistor or resistance load to overcome the threshold voltage (about 1V-4V) of the Poly-Si TFT. Therefore, the Poly-Si LCD panel 10 can process the signals outputted from the timing controller 11 correctly.

The shift registers 131 operate at 9V and the frequency of the gate clock $CLK_G$. They are connected to each other in series and shift the gate start pulse signal $SP_G$ to generate scan pulses on the scan lines $\mathbf{14}_1$-$\mathbf{14}_m$ in sequence. These scan pulses conduct TFTs connected with the scan lines $\mathbf{14}_1$-$\mathbf{14}_m$ in the pixel array 17. In addition, the shift registers 151 operate at 9V and the frequency of the source clock $CLK_S$. They are connected to each other in series and shift the source start pulse signal $SP_S$ to generate source pulses to the samplers/holders 152 in sequence. The samplers/holders 152 receive the source pulses to sample data signals DATA and output the sample result to the pixel array 17 through the data lines $\mathbf{16}_1$-$\mathbf{16}_n$ in sequence.

Under this architecture as shown in FIG. 1, the circuits formed on the Poly-Si LCD panel 10 operates at 9V. However, in practice, some of these circuits can operate normally at 5V. Referring to FIG. 2, the scan-line driving circuit 13 further includes a plurality of level shifters 132, and the data-line driving circuit 15 further includes a plurality of level shifters 153. The level shifters 11 operate at 5V to convert the voltages of the gate start pulse signal $SP_G$, the gate clock $CLK_G$, the source start pulse signal $SP_S$, the source clock $CLK_S$, and the data signals DATA from 3V into 5V.

The shift registers 131 operate at 5V and shift the gate start pulse signal $SP_G$ to generate scan pulses in sequence. The level shifters 132 convert the voltages of the scan pulses from 5V into 9V, and subsequently output these scan pulses to the scan lines $\mathbf{14}_1$-$\mathbf{14}_m$. The shift registers 151 operate at 5V and shift the source start pulse signal $SP_S$ to generate source pulses in sequence. The level shifters 153 convert the voltages of source pulses from 5V into 9V, and subsequently output these source pulses to the samplers/holders 152. The samplers/holders 152 receive the source pulses to sample the data signals DATA in sequence, and output the sample result to the pixel array 17 through the source data lines $\mathbf{16}_1$-$\mathbf{16}_n$.

Because the shift registers 151 in the data-line driving circuit 15 operate at voltage 5V reduced from 9V, the data-line driving circuit 15 as shown in FIG. 2 is less power consumptive than that as shown in FIG. 1. However, the shift registers 151 of FIG. 2 need additional level shifters 153 to convert the voltages of the output signal from 5V to 9V. Therefore, the data-line driving circuit 15 as shown in FIG. 2 is more expensive. Besides, since the additional level shifters 153 operate at 9V, the data-line driving circuit 15 of FIG. 2 is still power consumptive.

It is therefore a subject of the invention to provide a system for displaying image and a driving method for a liquid crystal displaying device, which can solve the problems described above.

SUMMARY OF THE INVENTION

In view of the foregoing, the invention is to provide a system for displaying image and a driving method for a liquid crystal displaying device, which operate at lower voltage and boost the voltages of the signals from low to high.

To achieve the above, a system for displaying image of the invention includes a driving circuit of a liquid crystal displaying device. The driving circuit of the liquid crystal displaying device includes a shift register, a voltage booster and a sample switch. The shift register receives an input pulse signal and shifts the input pulse signal to output an output pulse signal. The voltage booster is electrically connected with the shift register to receive the output pulse signal, and generates a boost voltage to output a boost signal within the enable time of the output pulse signal. The sample switch is electrically connected with the voltage booster to receive the boost signal. The boost signal controls the sample switch to sample a data signal.

To achieve the above, a driving method of a liquid crystal displaying device of the invention is for boosting a pulse signal of a shift register. The driving method includes the following steps of: boosting the pulse signal by a boost voltage to output a boost signal within the enable time of the pulse signal, and conducting a sample switch to sample a data signal by the boosted pulse signal.

As mentioned above, the shift registers and the voltage boosters of the invention operate at lower voltage. Besides the voltage boosters boost the pulses outputted from the shift registers and outputs the boost signals at higher voltage. Therefore, not only the driving circuit generates the high voltage signal to control the sample switch work normally, but also the power consumption of the shift registers and the voltage boosters is reduced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
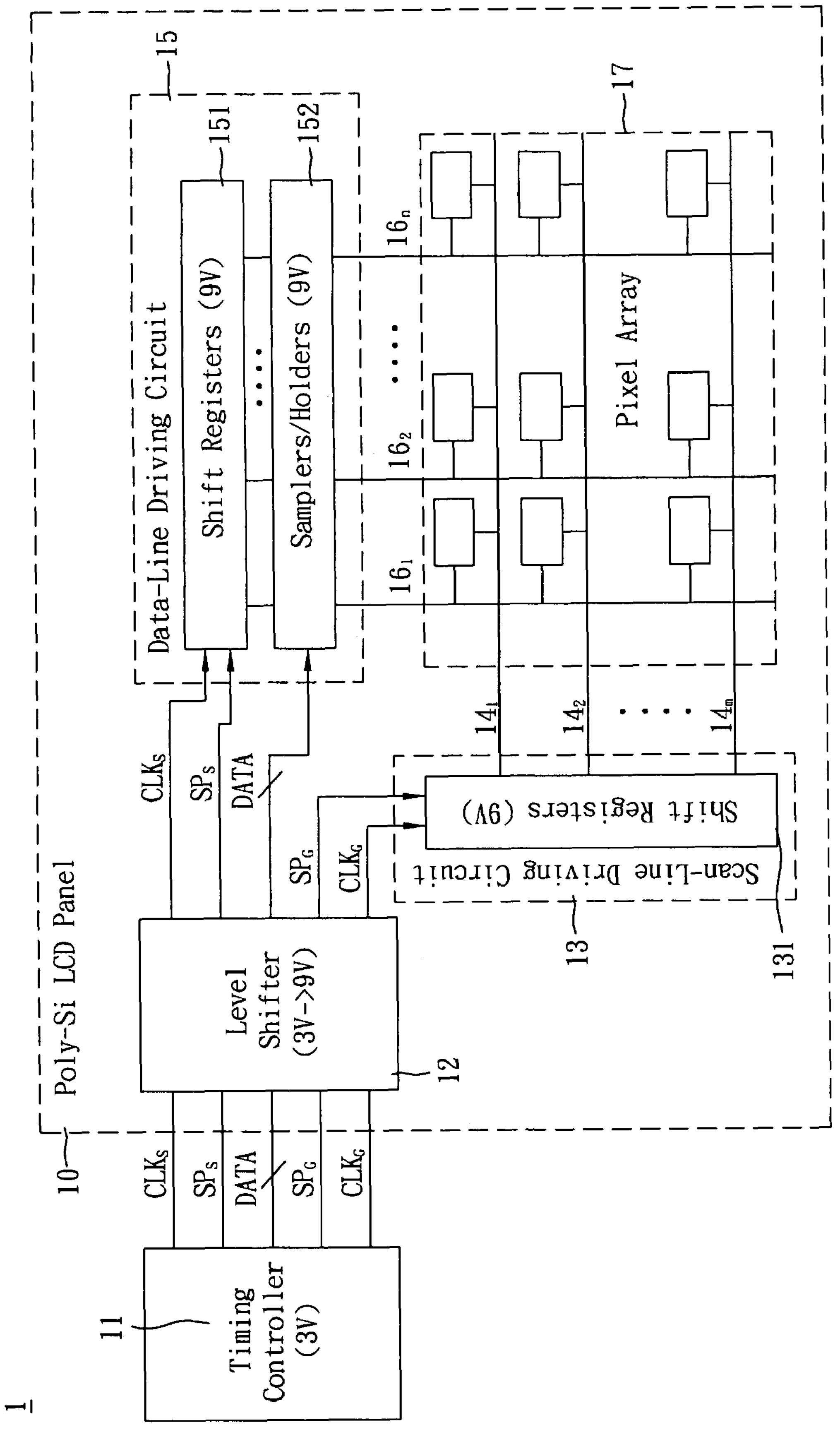
FIG.1 (PRIOR ART)
FIG. 1 is a block diagram showing the conventional driving circuit of the LCD device.
Figure 2:
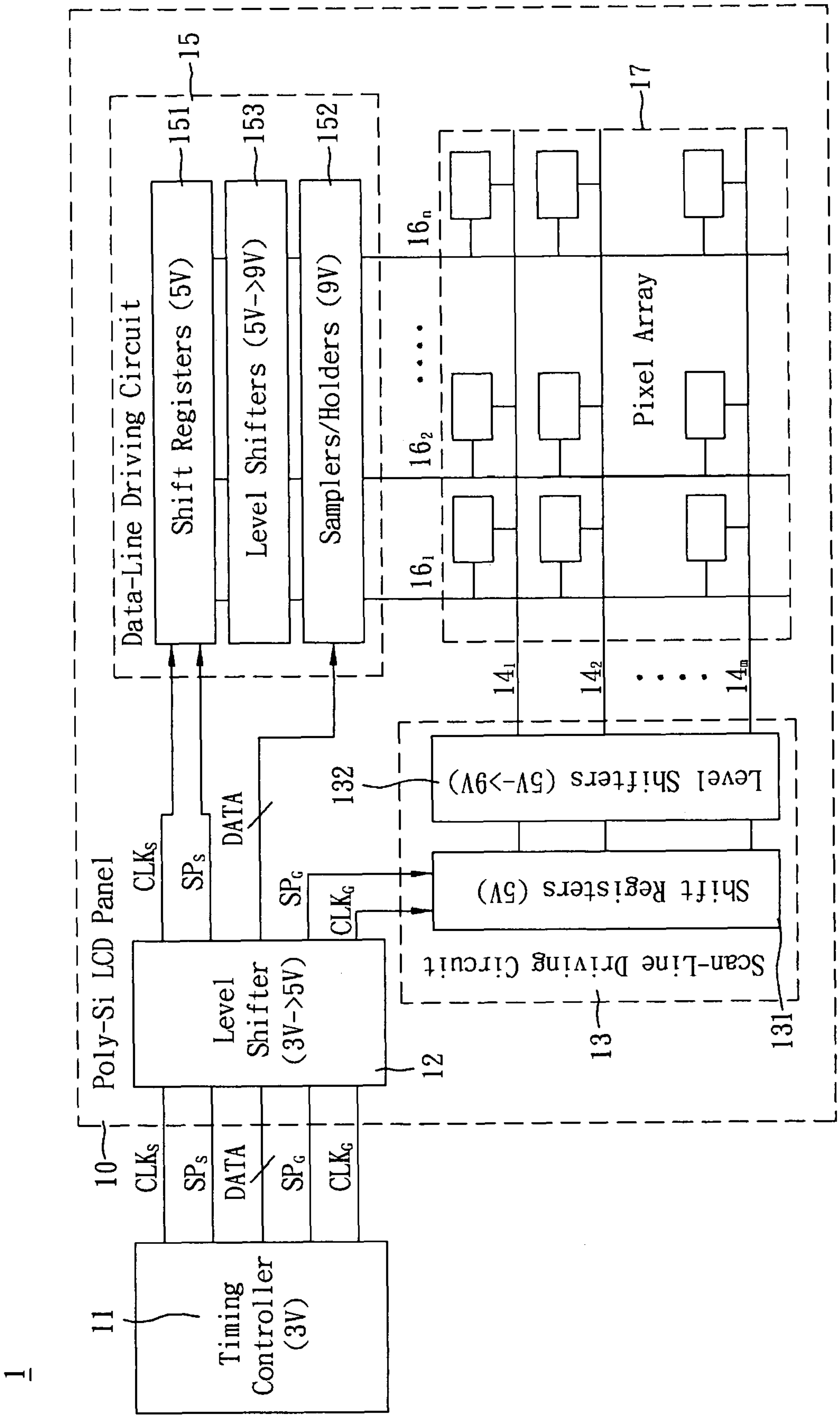
FIG. 2 (PRIOR ART)
FIG. 2 is another block diagram showing the conventional driving circuit of the LCD device.
Figure 3:
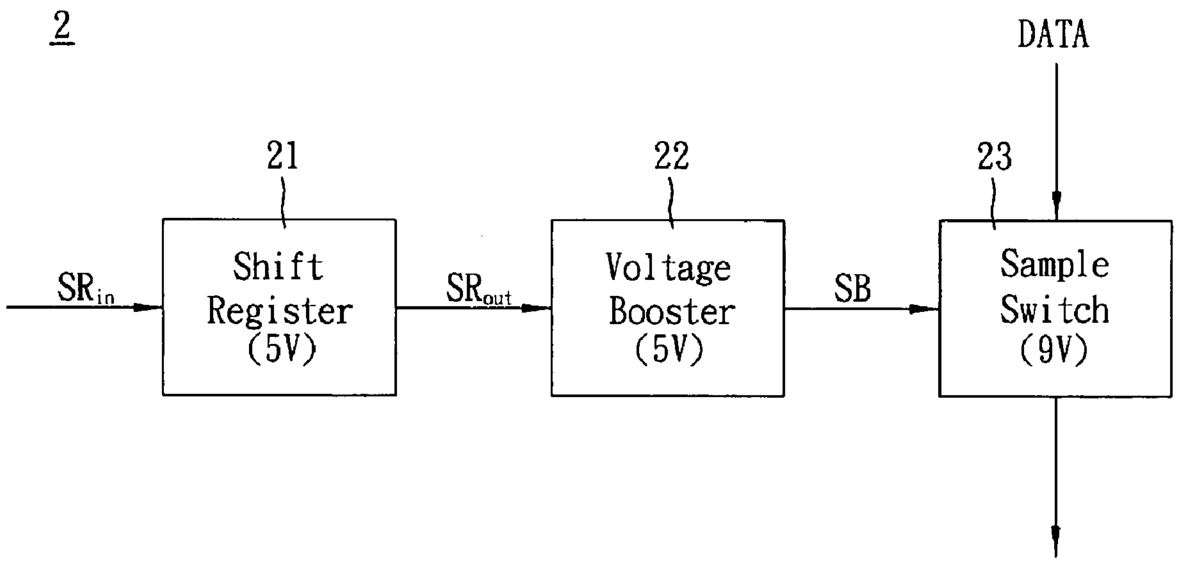
FIG. 3 is a block diagram showing a driving circuit of an LCD device according to a preferred embodiment of the invention.

Referring to FIG. 3, a system for displaying image according to an embodiment of the invention includes a driving circuit 2 for a liquid crystal displaying device. The driving circuit 2 includes at least one shift register 21, at least one voltage booster 22 and at least one sample switch 23. The shift register 21 receives an input pulse signal $SR_{in}$ and shifts the input pulse signal $SR_{in}$ to output an output pulse signal $SR_{out}$. The voltage booster 22 is electrically connected with the shift register 21 to receive the output pulse signal $SR_{out}$, and generates a boost voltage $V_{boost}$ to output a boost signal SB within the enable time of the output pulse signal $S_{out}$. The sample switch 23 is electrically connected with the voltage booster 22 to receive the boost signal SB. The boost signal SB controls the sample switch 23 to sample a data signal DATA.

Figure 4:
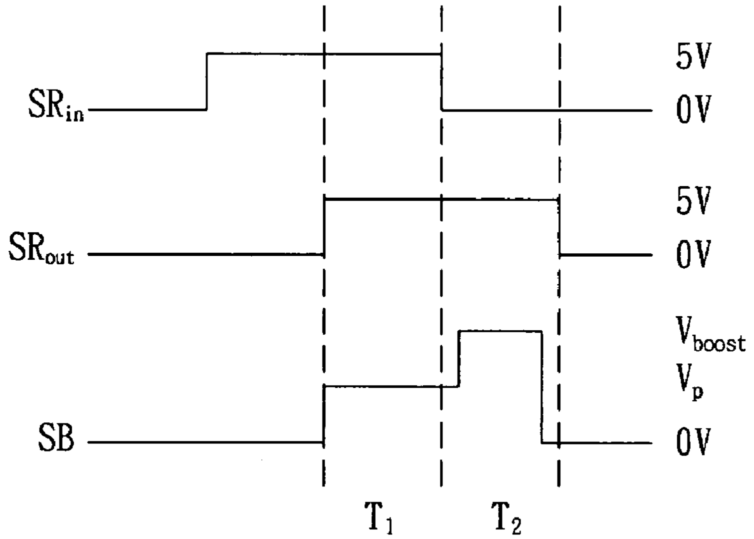
FIG. 4 is a waveform diagram showing the pulse signals and the boost signal of FIG. 3.

In this embodiment, the driving circuit 2 can be a data-line driving circuit. The shift register 21 and the voltage booster 22 can operate at 5V. The highest voltage of the input pulse signal $SR_{in}$ and the output pulse signal $SR_{out}$ is at 5V. The voltage booster 22 receives the output pulse signal $SR_{out}$ and subsequently generates a pre-charged voltage $V_p$ during a first period $T_1$ of the enable time of the output pulse signal $SR_{out}$ to charge the boost signal SB from 0V to the operating voltage of the voltage booster 22. Then, the voltage booster 22 uses a capacitor to generate a boost voltage $V_{boost}$ during a second period $T_2$ of the enable time of the output pulse signal $S_{out}$ to boost the voltage of the boost signal about to 9V. The waveforms of the above-mentioned signals are shown in FIG. 4. Therefore, the shift register 21 in the driving circuit 2 can operate at lower voltage. The voltage booster 22 not only replaces the voltage booster to output higher voltage signal correctly, but also operates at lower voltage for reducing the power consumption.

Figure 5:
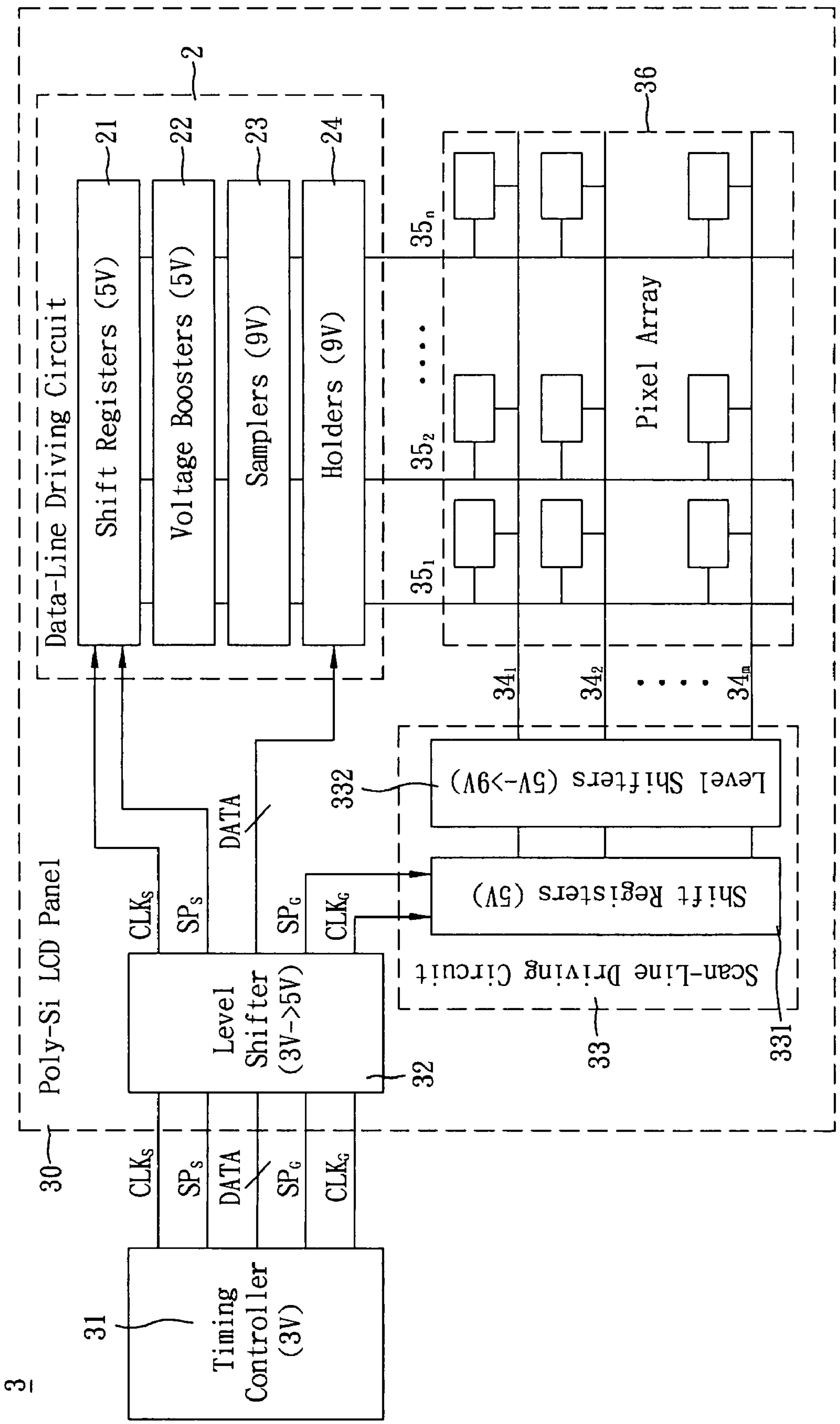
FIG. 5 is a block diagram showing an LCD device according to the preferred embodiment of the invention.

Referring to FIG. 5, a system for displaying image according to an embodiment of the present invention can include a liquid crystal displaying device 3. The liquid crystal displaying device 3 includes an LCD panel 30 and a timing controller 31. The LCD panel 30 is electrically connected with the driving circuit 2 to receive the data signals DATA. Then, the LCD panel 30 displays image according to the data signals DATA.

The LCD panel 30 includes a level shifter 32, a scan-line driving circuit 33, a plurality of scan lines $\mathbf{34}_1$-$\mathbf{34}_m$, the data-line driving circuit 2, a plurality of data lines $\mathbf{35}_1$-$\mathbf{35}_n$, and a pixel array 36. The scan-line driving circuit 33 is electrically connected with the pixel array 36 via the scan lines $\mathbf{34}_1$-$\mathbf{34}_m$. The data-line driving circuit 2 is electrically connected with the pixel array 36 via the data lines $\mathbf{35}_1$-$\mathbf{35}_n$. The scan-line driving circuit 33 includes a plurality of shift registers 331 and level shifters 332. The data-line driving circuit 2 includes a plurality of shift registers 21, logic control circuits 25 (see FIG. 6), voltage boosters 22, sample switches 23 and holders 24.

In this embodiment, the timing controller 31 operates at 3V and outputs a gate start pulse signal $SP_G$, a gate clock $CLK_G$, a source start pulse signal $SP_S$, a source clock $CLK_S$, and a plurality of data signals DATA. The level shifters 32 operate at 5V and convert the voltages of these signals from 3V into 5V.

The shift registers 331 operate at 5V and the frequency of the gate clock $CLK_G$. They are connected to each other in series and shift the gate start pulse signal $SP_G$ to generate scan pulses in sequence. The level shifters 332 convert the voltages of these scan pulses from 5V into 9V, and subsequently output these scan pulses to the scan lines $\mathbf{34}_1$-$\mathbf{34}_m$.

Figure 6:
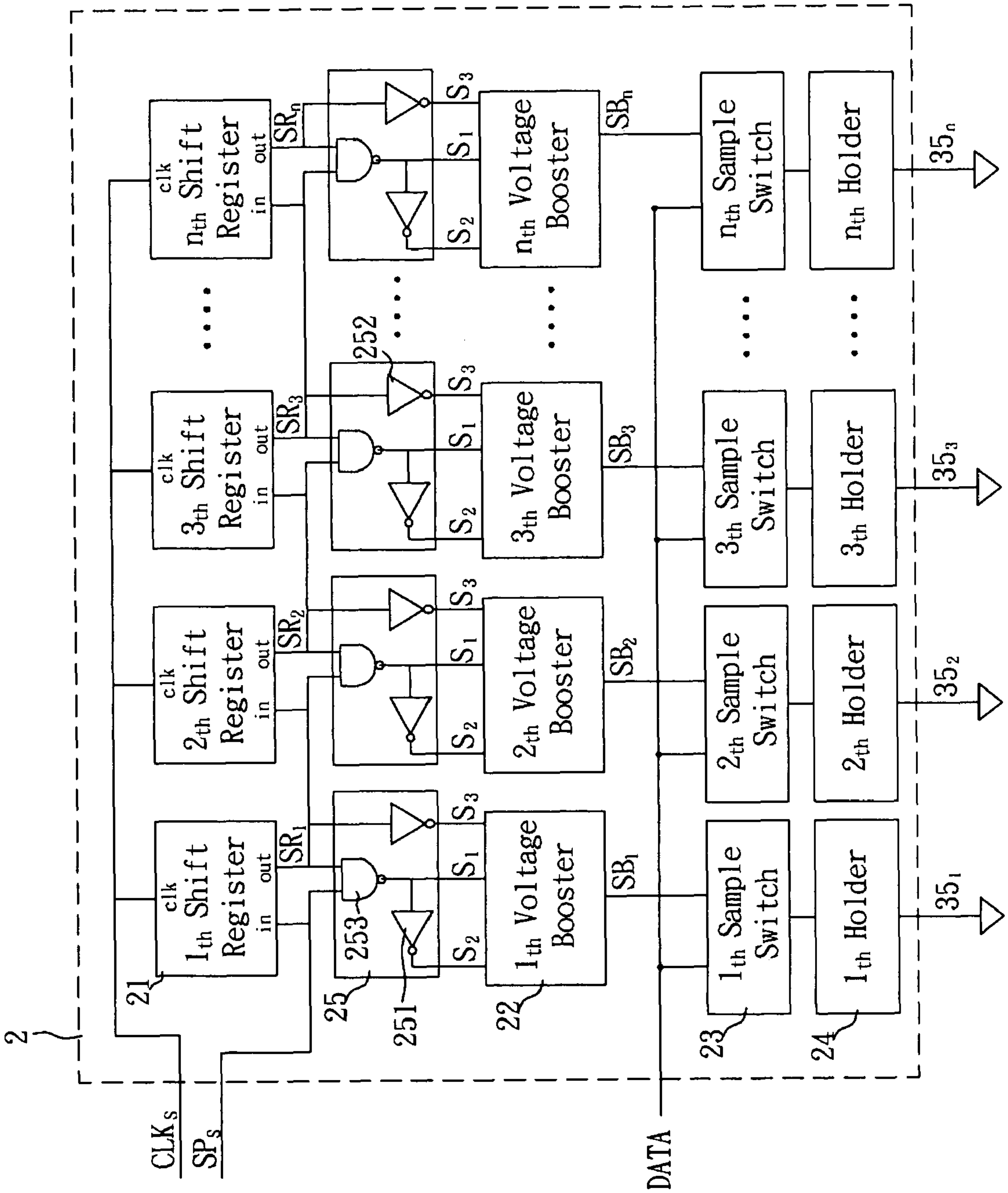
FIG. 6 is another block diagram showing the driving circuit of the LCD device according to the preferred embodiment of the invention.
Figure 7:
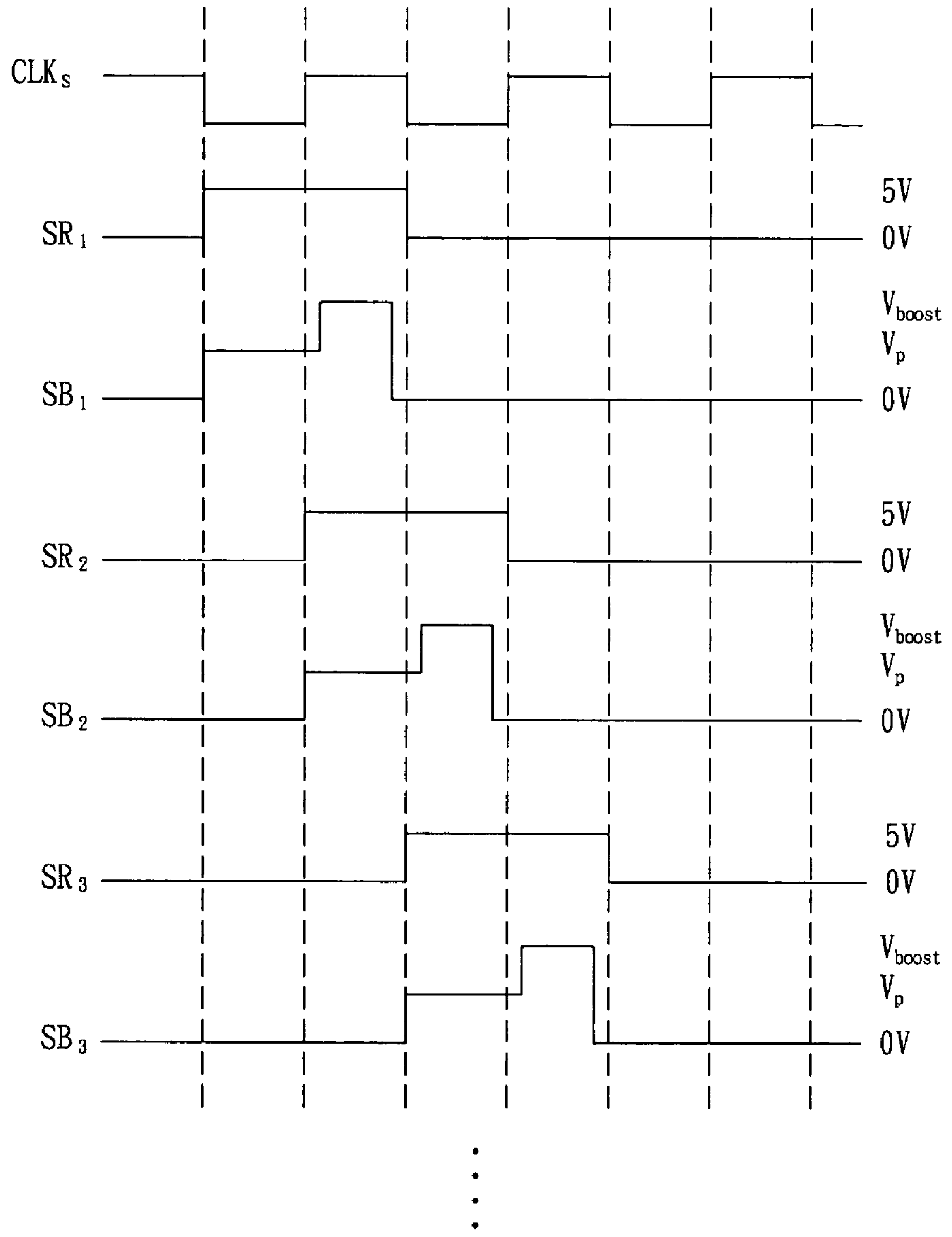
FIG. 7 is a waveform diagram showing the pulses outputted from the shift registers and the boost signals of FIG. 6.

Referring to FIG. 6, the shift registers 21 operate at 5V and the frequency of the source clock $CLK_S$. They are connected to each other in series and shift the source start pulse signal $SP_S$ in half circle of the source clock $CLK_S$ to generate source pulses in sequence. Because the shift registers 21 are connected in series, the output source pulse from one shift register is the input pulse for the next shift register 21. The waveforms of these pulse signals $SR_1$-$SR_n$ outputted from the shift register 21 are shown in FIG. 7.

Figure 8:
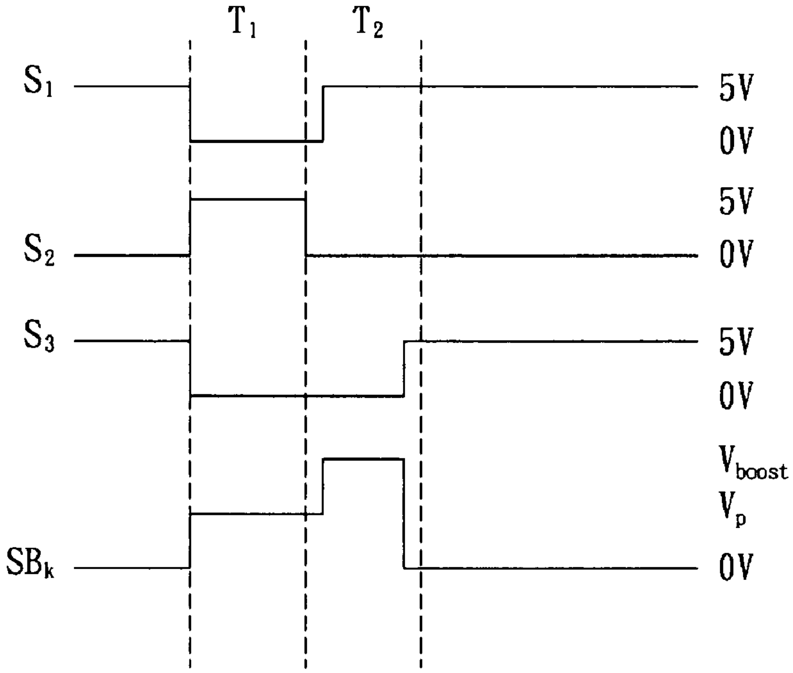
FIG. 8 is a waveform diagram showing the control signals and the boost signal of FIG. 6.

Please referring to FIG. 6 again, the logic control circuit 25 can include an NAND gate 253, a first NOT gate 251, and a second NOT gate 252. Assuming k is a positive integer from 1 to n. In the k-th logic control circuit 25, the NAND gate 253 receives the pulse signal $SR_{k-1}$ and $SR_k$ to output a first control signal $S_1$. The first NOT gate 251 receives the first control signal $S_1$ and then reverses it to output a second control signal $S_2$. The second NOT gate 252 receives the pulse signal $SR_k$ and reverses it to output a third control signal $S_3$. The waveforms of these control signals are shown in FIG. 8. Besides, because the highest voltages of the pulse signal $SR_{k-1}$ and $SR_k$ are at 5V, the highest voltages of these signals are also at 5V.

Figure 9:
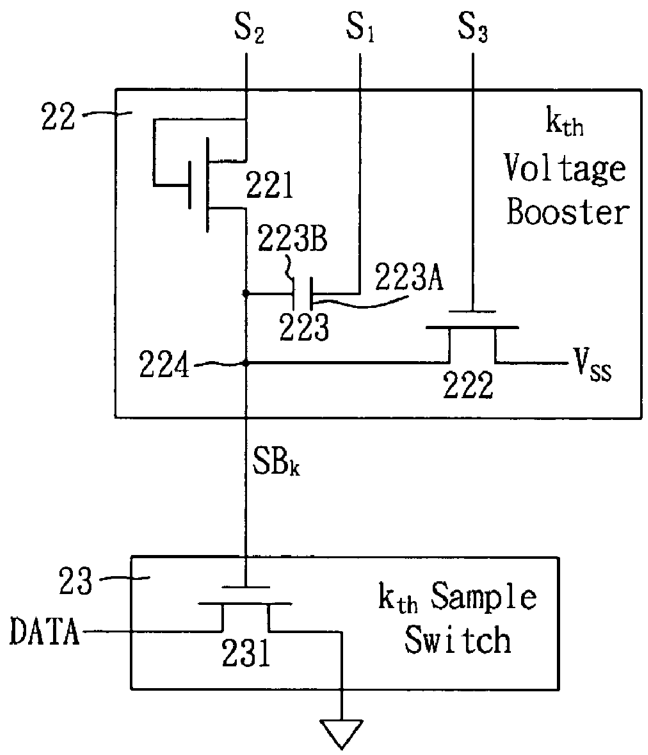
FIG. 9 is a circuit diagram showing the voltage booster and the sample switch of FIG. 6.

Referring to FIG. 9, the voltage booster 22 can include a capacitor 223, a first transistor 221, an output node 224 and a second transistor 222. The capacitor 223 has a first node 223A and a second node 223B. The sample switch 23 can include a third transistor 231.

For instance, the k-th voltage booster 22 is electrically connected with the k-th logic control circuit 25 and the k-th sample switch 23. The first node 223A of the capacitor 223 is electrically connected with the NAND gate 253 to receive the first control signal $S_1$. The source node of the first transistor 221 is electrically connected with the second node 223B of the capacitor 223, and the drain node and gate node of the first transistor 221 are electrically connected with the first NOT gate 251 to receive the second control signal $S_2$. The source node of the second transistor 222 is electrically connected with a ground $V_{SS}$, the drain node of the second transistor 222 is electrically connected with the second node 223B of the capacitor 223, and the gate node of the second transistor 222 is electrically connected with the second NOT gate 252 to receive the third control signal $S_3$. The output node 224 is electrically connected with the second node 223B of the capacitor 223 and the gate node of the third transistor 231.

Please refer to FIG. 8 and FIG. 9. Before the first period $T_1$, the third control signal $S_3$ is at high voltage 5V, so the second transistor 222 is conducting. Therefore, the capacitor 223 discharges through the ground $V_{SS}$, such that the voltages of the first node 223A and the output node 224 approach 0V. The output node 224 outputs the boost signal $SB_k$ according to the low voltage 0V.

During the first period $T_1$, the second control signal $S_2$ is at high voltage, and both the first control signal $S_1$ and the third control signal $S_3$ are at low voltage 0V. Therefore, the first transistor 221 is conducting and the second transistor 222 is not conducting. Consequently, the capacitor 223 is disconnected from the ground $V_{SS}$. The second control signal $S_2$ charges the capacitor 223 to generate the pre-charged voltage $V_p$ on the output node 224. The output node 224 outputs the boost signal $SB_k$ according to the pre-charged voltage $V_p$. The pre-charged voltage $V_p$ is restricted to about 3V-4V by the first transistor 221.

During the second period $T_2$, the first control signal $S_1$ is at high voltage 5V, and both the voltage of the second control signal $S_2$ and the third control signal $S_3$ are at low voltage 0V. Therefore the first transistor 221 and the second transistor 222 are not conducting. Consequently, the capacitor 223 is disconnected from the ground $V_{SS}$ and the second control signal $S_2$. The voltage of the capacitor 223 is only controlled by the first control signal $S_1$. In addition, the first control signal $S_1$ boosts the first node 223A of the capacitor 223 to high voltage 5V, so the voltage of the second node 223B is also boosted from the pre-charged $V_p$ to 5V. Then, the boost voltage $V_{boost}$ is generated at the second node 223B. The output node 224 outputs the boost signal $SB_k$ according to the boost voltage $V_{boost}$. Because the boost voltage $V_{boost}$ is about 9V, the boost signal $SB_k$ can overcome the threshold voltage of the third transistor 231.

After the second period $T_2$, the third control signal $S_3$ conducts the second transistor 222 such that the capacitor 223 and the ground $V_{SS}$ are electrically connected with each other. Therefore, the capacitor 223 discharges through the ground $V_{SS}$, and the voltages of the second node 223B and the output node 224 are reduced to the low voltage of 0V. The output node 224 outputs the boost signal $SB_k$ according to the low voltage 0V.

The third transistor 231 is controlled by the boost signal $SB_k$. The drain node of the third transistor 231 receives the data signal DATA, and the gate node of the third transistor 231 is electrically connected with the output node 224 to receives the boost signal $SB_k$. Because the voltage of the boost signal $SB_k$ is higher than the threshold voltage of the third transistor 231 during the second period $T_2$, the third transistor 231 is conducting to output the data signal DATA from the source node to the holder 24.

Please refer to FIG. 6 and FIG. 7 again. The voltage boosters 22 receive the pulse signal to output the boost signal $SB_1$-$SB_n$ to the sample switches 23. Thus, the sample switches 23 sample the data signals DATA and the holders 24 retrieve the data signals DATA, and the data signals DATA are transmitted correctly to the data lines $35_1$-$35_n$.

Figure 10:
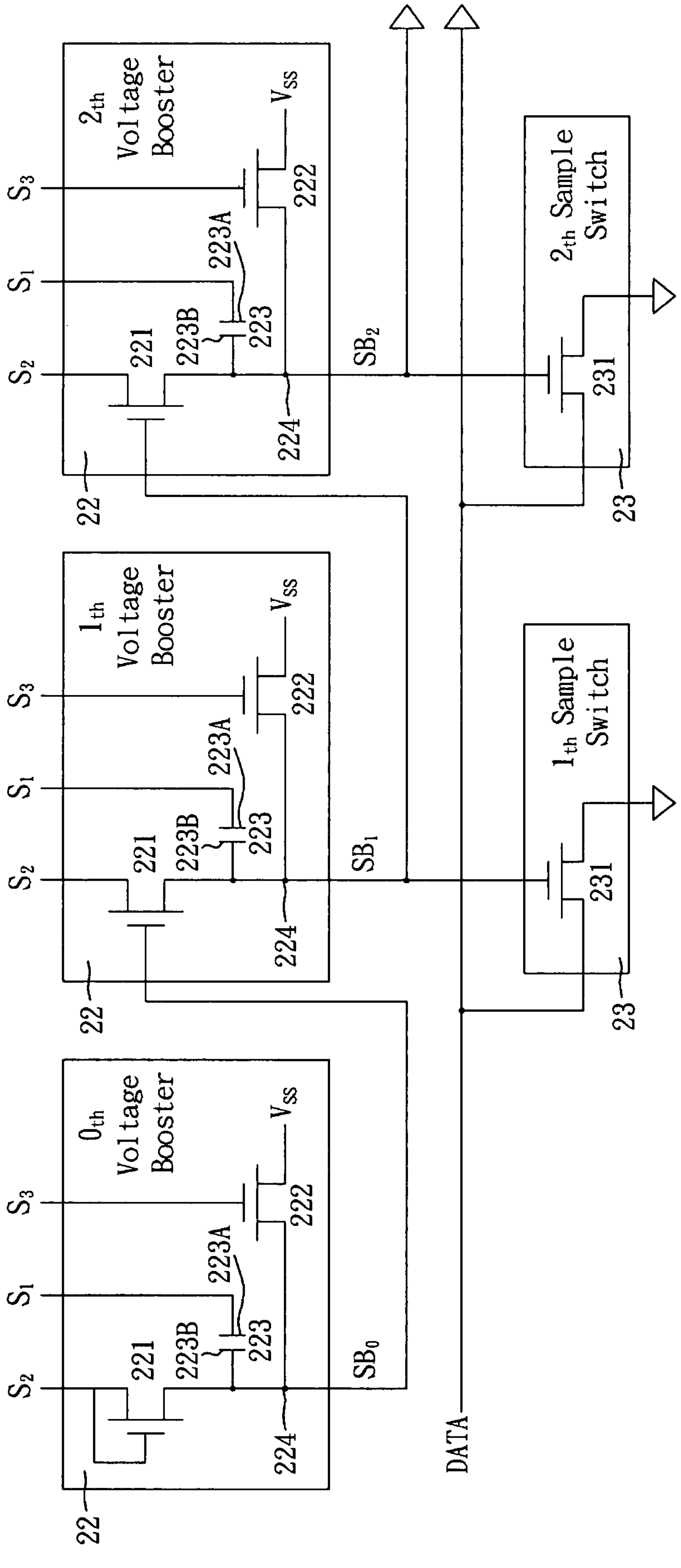
FIG. 10 is another circuit diagram showing the voltage boosters and the sample switches of FIG. 6.
Figure 11:
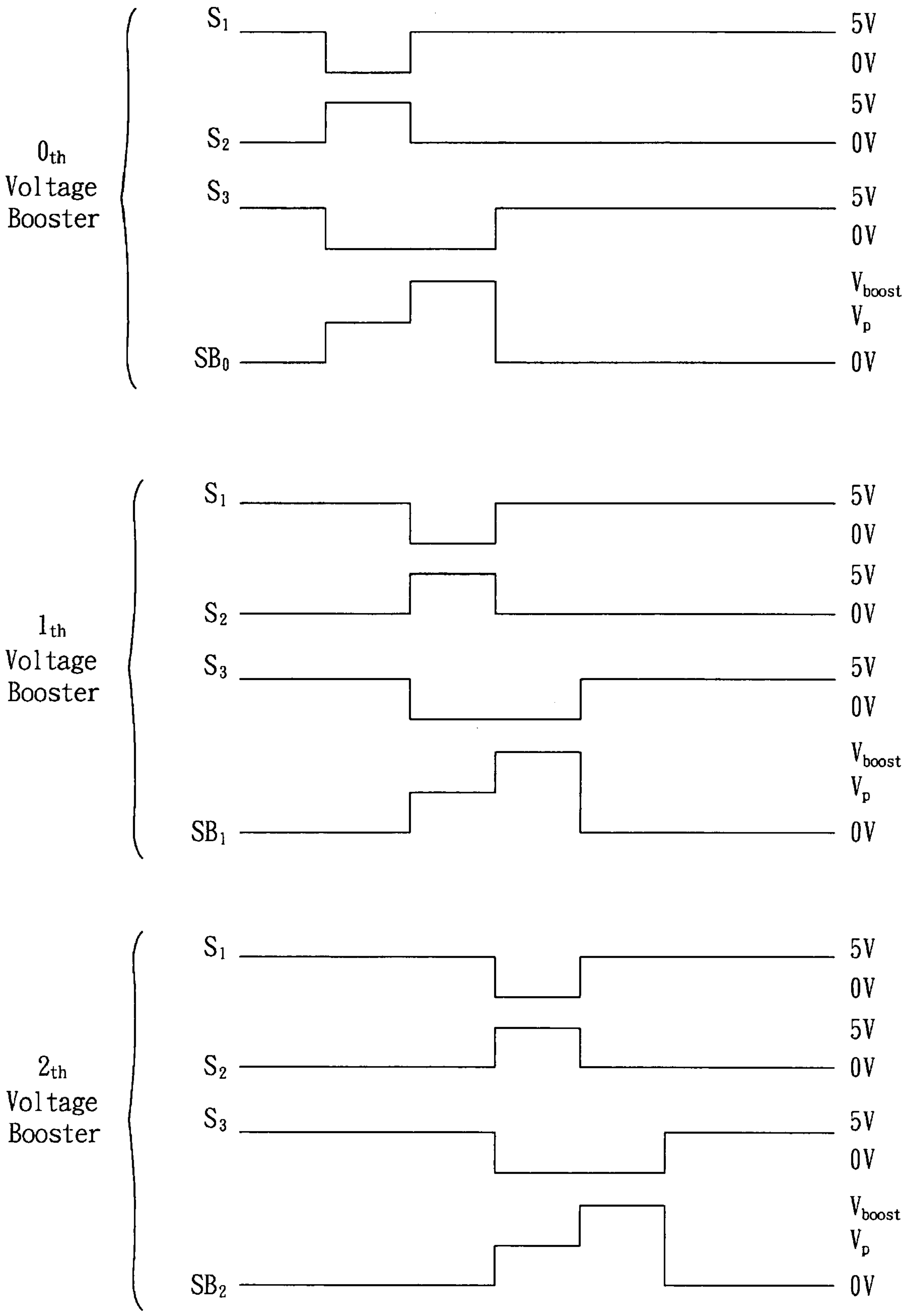
FIG. 11 is a waveform diagram showing the control signals and the boost signals of FIG. 10.

Referring to FIG. 10, the first voltage booster 22 cascades with a 0-th voltage booster 22. Under this architecture, the structure of the 0-th voltage booster 22 is the same as the structure of the voltage booster 22 as shown in FIG. 9. However, the gate node of the first transistors 221 in the first to n-th voltage boosters 22 are respectively electrically connected with the output nodes 224 of the last voltage booster 22 to receive the last boost signals. When the voltage of the boost signal is boosted to the boost voltage $V_{boost}$ (9V), the boost signal can conduct the third transistor 231 corresponding to the current voltage booster and the first transistor 221 in the next voltage booster. The first and later voltage boosters 22 are much guaranteed to operate normally. The waveforms of the input/output signals of the 0-th and the first voltage booster 22 are shown in the FIG. 11.

Figure 12:
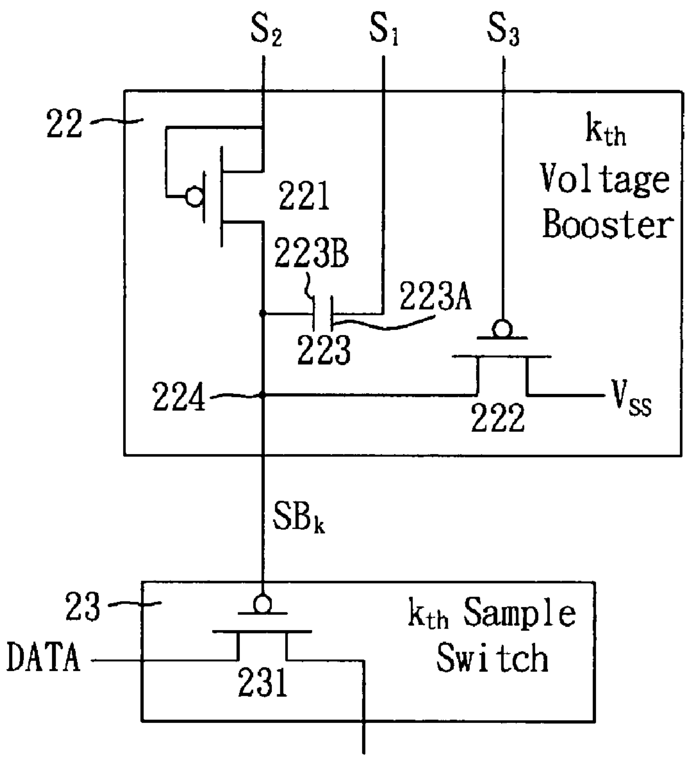
FIG. 12 is another circuit diagram showing the voltage booster and the sample switch of FIG. 6.
Figure 13:
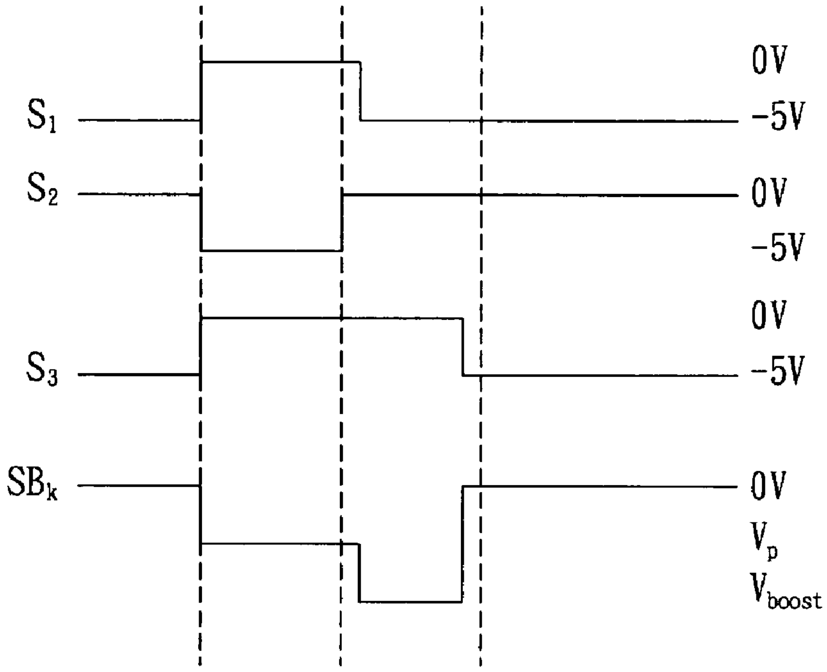
FIG. 13 is a waveform diagram showing the control signals and the boost signal of FIG. 12.

In the above embodiments, the transistors in the voltage booster 22 are implemented with NMOS transistors. In addition, referring to FIG. 12, the transistors in the voltage booster 22 may be implemented with PMOS transistors. In this structure, the control signals are reversed before inputted to the voltage booster 22, such that the voltage booster 22 can generate the boost signal $SB_k$ correctly. The waveforms of the input/output signals of the voltage booster 22 are shown in FIG. 13.

Figure 14:
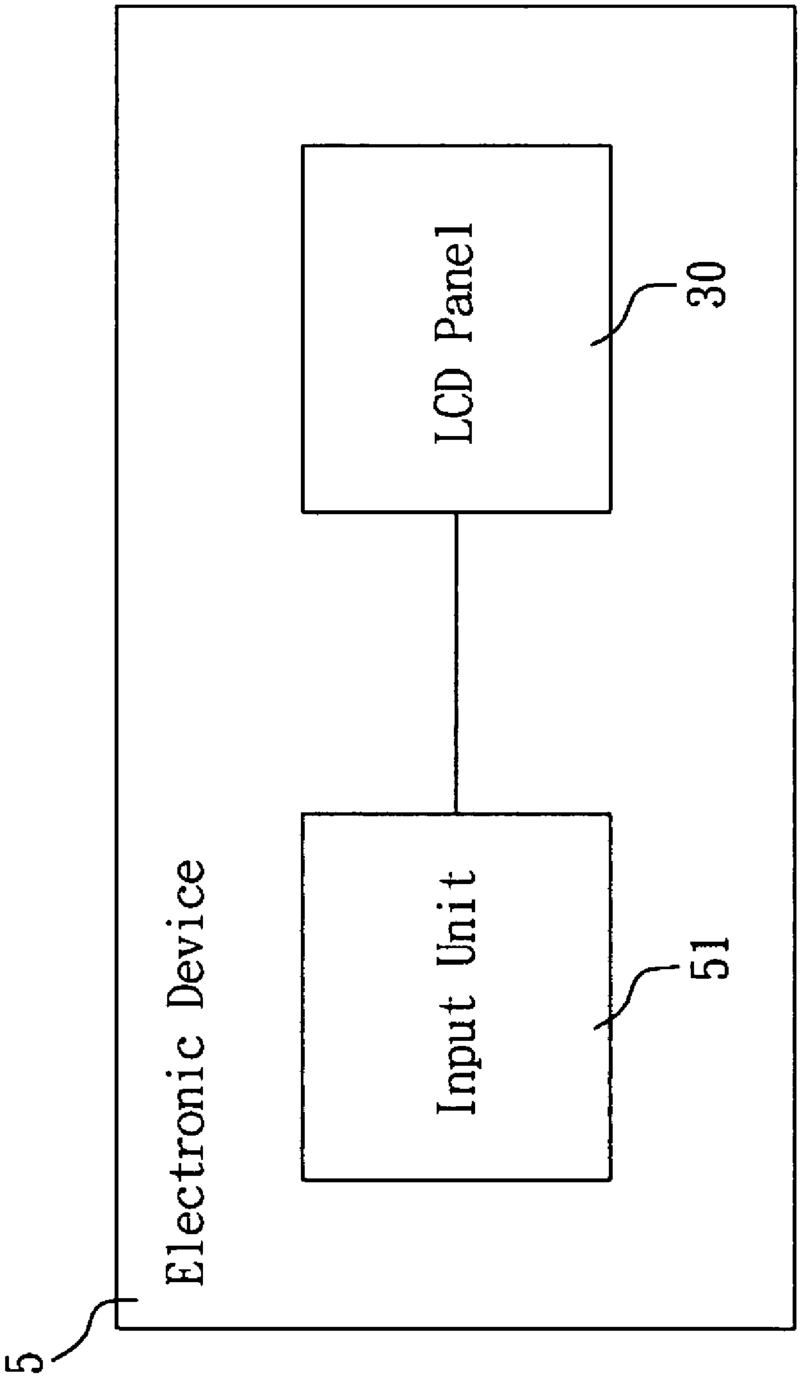
FIG. 14 is a block diagram showing a system for displaying image according to the preferred embodiment of the invention.

Referring to FIG. 14 according to an embodiment of the present invention, a system 4 for displaying image includes an electronic device 5. The electronic device 5 includes the LCD panel 30 and an input unit 51. The input unit 51 is coupled to the LCD panel 30 and provides input signals (e.g., an image signal) to the LCD panel 30 to generate images. The electronic device 5 can be a mobile phone, digital camera, PDA (personal data assistant), notebook computer, desktop computer, television, car display, or portable DVD player, for example.

Figure 15:
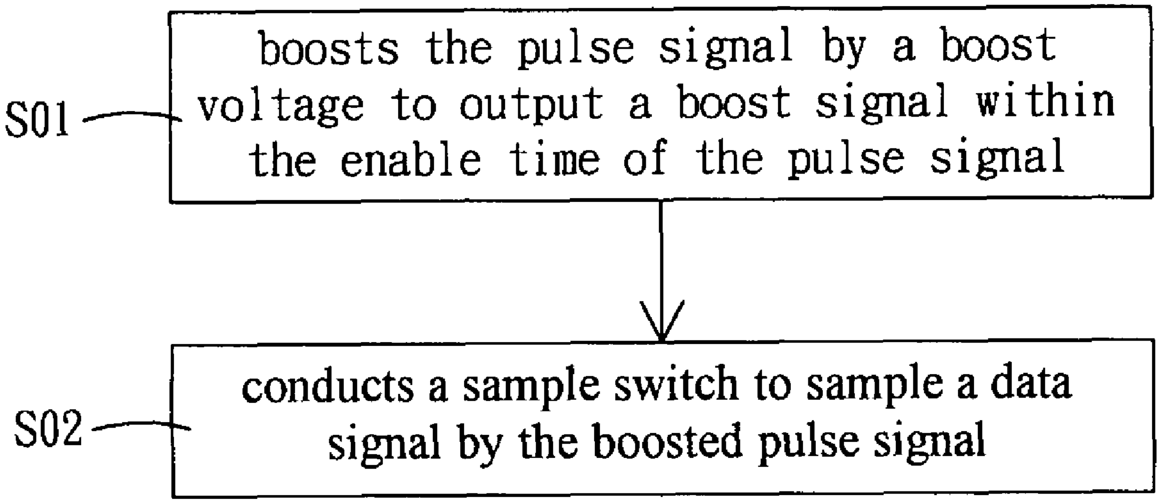
FIG. 15 is a flow chart showing a driving method of the LCD device according to the preferred embodiment of the invention.

Referring to FIG. 15, a driving method of a liquid crystal displaying device according to a preferred embodiment of the invention is for boosting a pulse signal of a shift register. The driving method includes steps S01-S02. The step S01 boosts the pulse signal by a boost voltage to output a boost signal within the enable time of the pulse signal. The step S02 conducts a sample switch to sample a data signal by the boosted pulse signal.

The step S01 may charge a capacitor to generate the pre-charged voltage on a first node of the capacitor during a first period, then boosts the voltage of a second node of the capacitor to generate the boost voltage at the first node during the second period. Therefore, the voltage of the first node of the capacitor is at the pre-charge voltage during the first period and at the boost voltage during the second period. Consequently, the boost signal is outputted according to the pre-charged voltage and the boost voltage.

In summary, in the liquid crystal displaying device, driving circuit and method of liquid crystal displaying device according to the invention, the shift registers and the voltage boosters operate at lower voltage. Besides the voltage boosters boost the pulses outputted from the shift registers and outputs the boost signals at higher voltage. Therefore, not only the driving circuit generates the high voltage signal to control the sample switch work normally, but also the power consumption of the shift registers and the voltage boosters is reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A system for displaying image comprising a driving circuit of a liquid crystal displaying device, wherein the driving circuit of the liquid crystal displaying device comprising:

a shift register receiving an input pulse signal and shifting the input pulse signal to output an output pulse signal;

a voltage booster electrically connected with the shift register for receiving the output pulse signal and generating a boost voltage to output a boost signal within the enable time of the output pulse signal; and a sample switch electrically connected with the voltage booster for receiving the boost signal, wherein the boost signal controls the sample switch to sample a data signal; and a logic control circuit, wherein the logic control circuit comprises:

an NAND gate receiving the input pulse signal and the output pulse signal to output a first control signal;

a first NOT gate receiving the first control signal to output a second control signal; and a second NOT gate receiving the output pulse signal to output a third control signal.

2. The system for displaying image as recited in claim 1, wherein the driving circuit is a data-line driving circuit.

3. The system for displaying image as recited in claim 1, wherein the voltage booster generates a pre-charge voltage and the boost voltage to output the boost signal respectively during a first period and a second period of the enable time of the output pulse signal.

4. The system for displaying image as recited in claim 3, wherein the voltage booster comprises:

a capacitor having a first node and a second node, wherein the capacitor is charged during the first period to generate the pre-charged voltage at the first node, and the voltage of the second node of the capacitor is boosted during the second period to generate the boost voltage at the first node; and an output node electrically connected with the first node of the capacitor for outputting the boost signal according to the pre-charged voltage and the boost voltage respectively during the first period and the second period.

5. The system for displaying image as recited in claim 1, wherein the voltage booster comprises:

a capacitor having a first node and a second node, wherein the first node is electrically connected with the first NAND gate for receiving the first control signal;

a first transistor having a source node electrically connected with the second node of the capacitor, and a drain node electrically connected with the first NOT gate for receiving the second control signal, wherein the second control signal charges the capacitor during the first period to generate the pre-charged voltage at the second node of the capacitor, and the voltage of the first node of the capacitor is boosted by the first control signal during the second period to generate the boost voltage at the second node of the capacitor;

an output node electrically connected with the second node of the capacitor for outputting the boost signal according to the pre-charged voltage and the boost voltage respectively during the first period and the second period; and a second transistor having a source node electrically connected with a ground, a drain node electrically connected with the second node of the capacitor, and a gate node electrically connected with the second NOT gate for receiving the third control signal, wherein the second transistor conducts the second node of the capacitor with the ground according to the third control signal to discharge the capacitor.

6. The system for displaying image as recited in claim 5, wherein the sample switch comprises:

a third transistor having a drain node for receiving the data signal and a gate node electrically connected with the voltage booster for receiving the boost signal, wherein the third transistor is controlled by the boost signal to output the data signal at the source node of the third transistor, and the boost voltage of the boost signal is larger than the cut-off voltage of the third transistor.

7. The system for displaying image as recited in claim 5, wherein the gate node of the first transistor is electrically connected with the drain node of the first transistor for receiving the second control signal.

8. The system for displaying image as recited in claim 5, wherein the gate node of the first transistor in the voltage booster is electrically connected with the output node of the last voltage booster to receive the boost signal of the last voltage booster.

9. The system for displaying image as recited in claim 1, further comprising:

a LCD panel electrically connected with the driving circuit to receive the data signals and displaying image according to the data signal.

10. The system for displaying image as recited in claim 9, further comprising:

an electronic device having the LCD panel and an input unit wherein the input unit is coupled to the LCD panel and provides input signals to the LCD panel to generate images.

11. The system for displaying image as recited in claim 10, wherein the electronic device is a mobile phone, a digital camera, a PDA (personal data assistant), a notebook computer, a desktop computer, a television, a car display, or a portable DVD player.

* * * * *